(12) United States Patent
Lin et al.

(10) Patent No.: US 8,095,007 B2
(45) Date of Patent: Jan. 10, 2012

(54) OPTICAL ADD/DROP MULTIPLEXER USING INTEGRATED OPTICAL COMPONENTS

(75) Inventors: Philip J. Lin, Newton, MA (US); James D. Mills, Wilmington, MA (US)

(73) Assignee: Tellabs Operations, Inc., Naperville, IL (US)

( * ) Notice: Subject to any disclaimer, the term of this patent is extended or adjusted under 35 U.S.C. 154(b) by 3236 days.

(21) Appl. No.: 10/144,674

(22) Filed: May 13, 2002

(65) Prior Publication Data

US 2002/0171890 A1    Nov. 21, 2002

Related U.S. Application Data

(60) Provisional application No. 60/291,506, filed on May 16, 2001.

(51) Int. Cl.
*H04J 14/02* (2006.01)
(52) U.S. Cl. .......................................................... 398/83
(58) Field of Classification Search .................. 398/138, 398/139, 164, 175, 176, 135, 83
See application file for complete search history.

(56) References Cited

U.S. PATENT DOCUMENTS

| | | | | |
|---|---|---|---|---|
| 5,550,818 | A * | 8/1996 | Brackett et al. | 370/395.51 |
| 5,646,560 | A * | 7/1997 | Nguyen | 327/109 |
| 6,301,254 | B1 | 10/2001 | Chan et al. | |
| 6,304,690 | B1 * | 10/2001 | Day | 385/24 |
| 6,333,799 | B1 * | 12/2001 | Bala et al. | 398/9 |
| 6,501,583 | B1 * | 12/2002 | Akashi et al. | 398/202 |
| 6,532,320 | B1 * | 3/2003 | Kikuchi et al. | 385/24 |
| 6,665,497 | B1 * | 12/2003 | Hamilton-Gahart et al. | 398/135 |
| 6,810,215 | B1 * | 10/2004 | Oikawa | 398/175 |
| 2001/0030786 | A1 | 10/2001 | Takahashi et al. | |
| 2001/0053015 | A1 * | 12/2001 | Thomas | 359/237 |
| 2002/0015551 | A1 | 2/2002 | Tsuyama et al. | |

OTHER PUBLICATIONS

Green et al., "40 Gb/s WDM Cross-Connect with an Electronic Switching Core; Preliminary Results from West Consortium.", Feb. 1997, IEEE, pp. 336-337.*
Paul E. Green, Jr., Frank J. Janniello, and Rajiv Ramaswami; WDM Protocol-Transparent Distance Extension Using R2 Remodulation; IEEE Journal on Selected Areas in Communications, vol. 14, No. 5, Jun. 1996.
Peter Ohlen and Eilert Berglind; IEEE Photonics Technology Letters, vol. 9. No. 7, Jul. 1997.

* cited by examiner

*Primary Examiner* — Leslie Pascal
(74) *Attorney, Agent, or Firm* — Husch Blackwell LLP

(57) ABSTRACT

An optical add/drop multiplexer incorporates an integrated receiver module and an integrated transmitter which are interfaced to an intervening electrical network to provide an add/drop/pass-through functionality. The receiver module incorporates a wavelength demultiplexer which is in turn combined with optical/electrical converters PIN photodiodes, and amplifiers on a per wavelength basis to output a plurality of parallel electrical signals in response to a common optical input. The transmitter module combines an integrated plurality of drive circuits and lasers for converting a plurality of parallel input electrical signals to a plurality of optical signals, on a per wavelength basis, which in turn are coupled via an optical wavelength multiplexer to a common output optical fiber. The interconnected electrical network, ring mesh or tree, can provide a reconfigurable electrical add/drop interface to other portions of the network.

19 Claims, 5 Drawing Sheets

TREE

MESH

OPTICAL ADD/DROP MULTIPLEXER USING INTEGRATED OPTICAL COMPONENTS

The benefit of the filing date of Provisional Patent Application Ser. No. 60/291,506, filed May 16, 2001 is hereby claimed.

FIELD OF THE INVENTION

The present invention relates to the field of optical networking. More specifically, the present invention relates to integrated optical add/drop multiplexers.

BACKGROUND OF THE INVENTION

In known optical communications systems, optical/electrical interfaces are created at nodes. In known Wave Division Multiplexing (WDM) Systems modulated information carrying light beams of selected wavelengths transmitted on a common fiber, can be added/dropped while others are passed-through at each node using such interfaces.

The interfaces need to accommodate a variety of rates and data formats (transparency) and be remotely configurable. One such interface is an optical add/drop multiplexer. Such multiplexers find application in optical networks of the type disclosed in U.S. Pat. No. 6,301,254B1, Virtual Path Ring Protection Method and Apparatus. The '254 patent is assigned to the assignee hereof and is incorporated by reference.

Known multiplexers are often formed of discrete components which require numerous connections. They are expensive to fabricate and can present quality control and reliability issues. Many of these systems are not remotely configurable. Others utilize 3R regeneration (re-amplify, re-shape, re-time) which requires prior knowledge of the data format of the traffic, and, which results in loss of transparency.

There continues to be a need for more cost effective add/drop multiplexers which also exhibit improved reliability. Preferably such multiplexers could be used in a variety of network configurations. It would also be preferable if bit-rate transparency could be maintained in the optical paths.

DETAILED DESCRIPTION

Figure 1:
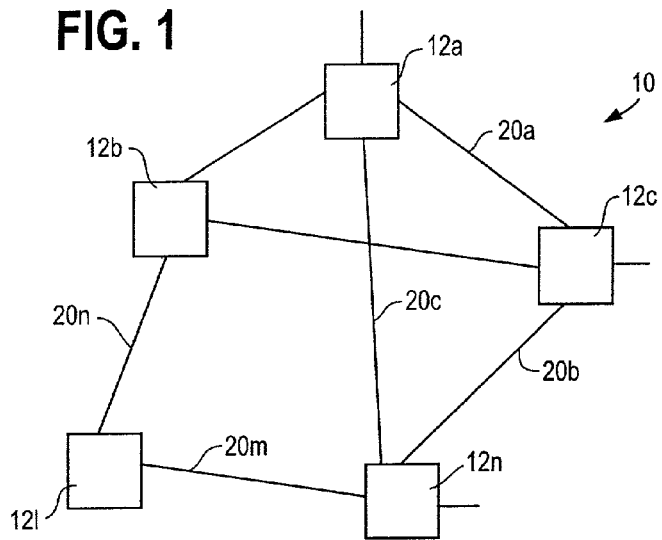
FIG. 1 illustrates a portion of an exemplary network in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Integrated optical component design and manufacturing techniques where multiple device functions are integrated onto a single device can be used to implement cost-effective add/drop multiplexers. Each integrated device replaces many discrete components. This leads to fewer spare parts and reduced manufacturing cost for the multiplexers. This approach reduces over-all system component cost because a large portion of the cost for such devices is typically associated with device packaging and fiber connections to the device. A crosspoint switch can be combined with the integrated devices at the respective nodes to provide remote configurability of the respective multiplexer and the network.

The multiplexers perform optical-electrical-optical conversions (through the use of transponder like regeneration) for all wavelengths including the pass-through wavelengths. The process regenerates all light paths at each multiplexer, on a per path basis, and eliminates the need for complicated link budget calculation and span engineering rules. The span engineering rules are required for some known versions of multiplexers that have optical pass-through.

The per path or wavelength regeneration allows for addition-deletion of nodes in the network without affecting the power budget of existing nodes. The conversion also permits wavelength switching to avoid stranded bandwidth, which is a problem for non-wavelength switching systems.

The multiplexers can be incorporated in ring networks. Protection schemes are allowed in this implementation.

A plurality of these integrated devices can be combined with a crosspoint switch to create larger degree nodes. In one embodiment, tree networks and mesh networks can be created. Such a tree network would correspond to a WDM version of a Passive Optical Network.

2R regeneration (re-amplify, re-shape) can be incorporated into respective devices without re-clocking (re-time) instead of 3R regeneration which requires clock recovery. 2R regeneration supports bit-rate transparency and permits each wavelength to operate at different bit-rates. This type of process was disclosed in Green, Jr. U.S. Pat. No. 5,483,372, now assigned to the assignee hereof.

In one disclosed embodiment, an integrated, arrayed, transmitter chip incorporates a plurality of K mono-chromatic sources, lasers, each operating at a different WDM wavelength, in combination with an integrated wavelength multiplexer on a common substrate. This chip has one fiber interface as compared to the discrete version which has 2K+1 fiber interfaces (one for each transmitter and K+1 for the multiplexer). An arrayed transmitter chip can be expected to be less costly than its discrete equivalent.

An arrayed receiver chip combines an integrated plurality of detectors with integrated waveguides coupled to an integrated wavelength demultiplexer on a common substrate. This chip can also be expected to be less expensive than the discrete counterpart. A plurality of transimpedance amplifiers and series coupled limiting amplifiers can also be integrated into the chip in order to 2R regenerate (reamplify, reshape) all received signals on a per wavelength (per lambda) basis.

According to another disclosed embodiment, a plurality of these chips are incorporated in an optical communication system. A crosspoint switch can be located between a receiver chip and a transmitter to add/drop or switch specific channels. The integrated chips reduce system cost while the crosspoint switch provides remote provisioning of light paths.

In the transmitter integrated lasers are provided on a per path or wavelength basis as optical sources. Laser drive electronics can also be integrated into the transmitter chip.

FIG. 1 illustrates a portion of an exemplary mesh network 10 that contains multiple electrical add/drop nodes 12a, b-n. These can, but need not, be substantially identical. Each add/drop module has fiber interfaces that accept and transmit WDM traffic via optical fibers 20a, b, —n. One or more WDM channels can be added or dropped. Once dropped, the electrical signal can be retimed. At the intermediate add/drops, "through" traffic is not retimed. 2R reamplification and reshaping is provided thereby preserving bit rate transparency.

Each add/drop node includes wavelength multiplexers and demultiplexers to combine and separate the wavelength channels. Photodiode receivers for example PIN photodiodes, and directly modulated laser transmitters electrically regenerate received signals and then convert them back to an optical format. A crosspoint switch can be used to add and drop traffic.

Figure 2A:
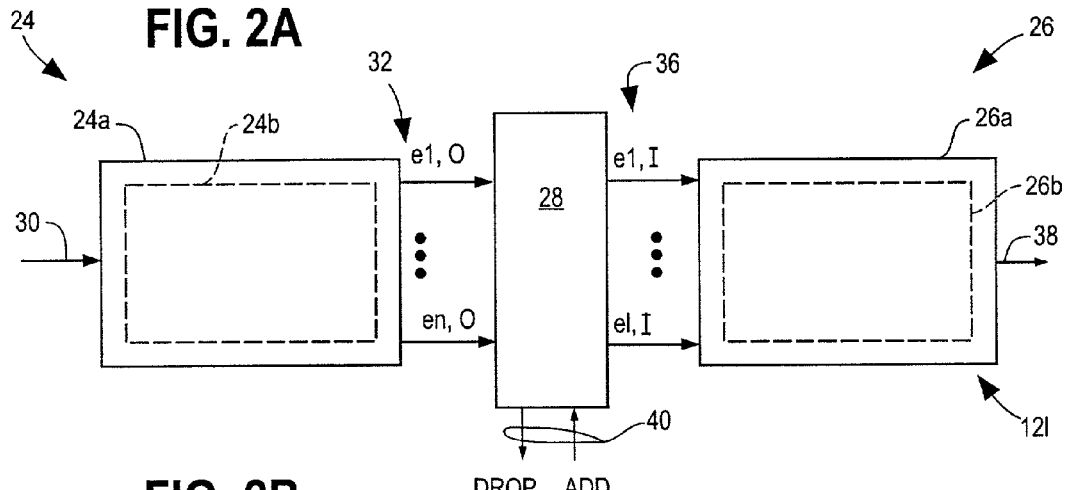
FIG. 2A illustrates an add/drop multiplexer in accordance with the present invention.

FIG. 2A illustrates details of a representative add/drop module, such as module 12l. Module 12l includes an integrated opto/electrical circuit receiver module 24, an integrated electrical/optical circuit transmitter module 26 and an electrical switching fabric, which could be implemented as a crosspoint switch, 28. Receiver module 24 is contained in a housing 24a and provides an optical input interface for an optical fiber 30 which might carry, for example, a WDM optical input signal, and a plurality of wavelength demultiplexed electrical output signals 32 which correspond to the channels (lambda) of the optical input signal. The module 24 includes a plurality of internal, integrated optical/electrical paths which are formed as integrated components on/in a common receiver circuit substrate 24b.

Transmitter module 26 is contained in a housing 26a and provides a multipath electrical interface for receipt of a plurality of electrical input signals 36 which in turn are each converted internally to an optical format, multiplexed and output to an optical output fiber 38. The integrated circuit 26 includes a plurality of internal, integrated electrical/optical paths which are formed as integrated components on/in a common transmitter circuit substrate 26b.

The electrical switching fabric 28 provides a remotely alterable electrical interface 40 to electrical layers of the network whereby one or more WDM channels can be added or dropped. The switch fabric 28 facilitates remote reconfiguration of the respective node in accordance with traffic requirements.

It will be understood that switch fabric 28 could be replaced with a plurality of hardwired electrical paths. In this embodiment, the network will not be reconfigurable.

Figure 2B:
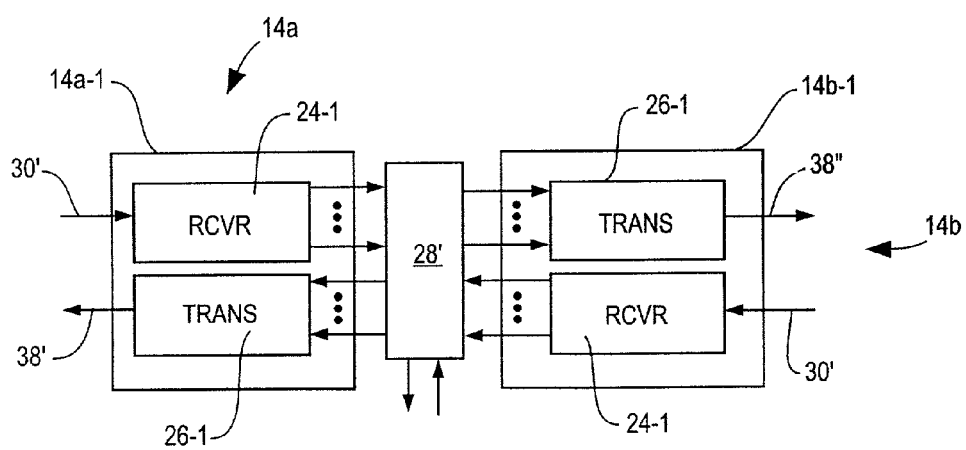
FIG. 2B illustrates an alternate embodiment of the add/drop multiplexer of FIG. 2A.

FIG. 2B illustrates integrated circuit transceivers 14a, b which can be identical. Each includes a receiver 24-1 and a transmitter 26-1, in accordance with receiver 24 and transmitter 26, in a respective package 14a-1, 14b-1. The transceivers 14a, b can be used as an alternate to receiver module 24 and transmitter module 26 to implement a bi-directional node, or to provide a single package implementation. Additionally, higher degree nodes in bi-directional networks, discussed subsequently, can be implemented using transceiver elements 14a, b.

Figure 3:
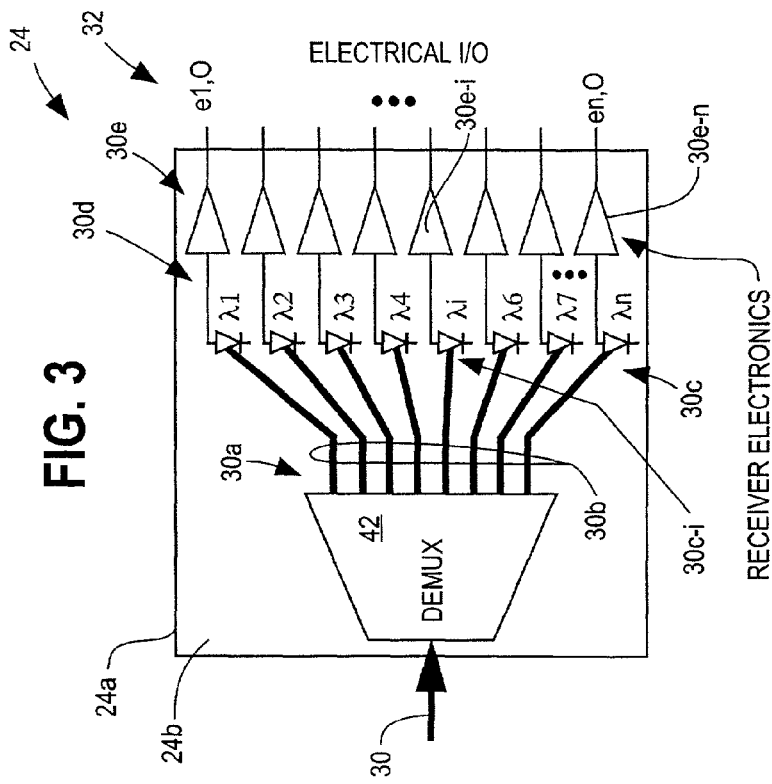
FIG. 3 illustrates details of an integrated receiver module usable in the add/drop multiplexer of FIG. 2A.

FIG. 3 illustrates details of integrated receiver module 24. It will be understood that a variety of known fabrication techniques can be used to implement receiver 24. Such details are not limitations of the present invention.

Receiver module 24 includes the substrate 24b which carries an optical wavelength demultiplexer 42 which converts for example, a WDM optical input signal on fiber 30 to a plurality 30a of information carrying output optical signals of differing wavelengths $\lambda 1, \lambda 2 \ldots \lambda n$. The members of the plurality of optical signals 30a are each coupled via respective members of a plurality of waveguides 30b, integrally formed on/in substrate 24b to respective members of a plurality of opto/electric converters 30c. The members of plurality 30c, which could be relatively inexpensive PIN photodiodes, are integrally formed on/in substrate 24b.

The parallel electrical outputs from the members of the plurality 30c, each an electrical representation of a demultiplexed WDM channel, are coupled via a plurality of conductive elements 30d integrally formed on/in substrate 24b to respective inputs of members of a plurality of gain or regeneration elements 30e.

Outputs from each photodiode, such as 30c-i are coupled to a respective amplifier element 30e-i which provides both reamplification and reshaping (2R regeneration) of the electrical representation of the electrical signal from respective converter 30d-i. It will be understood that a variety of amplifier structures are usable in receiver 24 without departing from the spirit and scope of the present invention. For example and without limitation, the members of the plurality 30e could each be integrally formed on/in substrate 24b as a transimpedance amplifier coupled in series with a limiting amplifier.

Outputs from receiver 24, a plurality of reamplified and reshaped electrical signals 32 can then be coupled to and switched via switching fabric 28 as discussed previously. Each optical channel, or wavelength, is reshaped electrically on a per channel basis avoiding known problems associated with mere amplification of a composite, WDM light beam.

One of the advantages of the configuration of receiver 24 is that the integrated combination of the multiplexer 42, optical waveguides 30b, converters 30d and amplifier circuitry 30e consolidate extensive connectivity into a single integrated circuit, This in turn reduces packaging costs, reduces the number of fiber interfaces, and reduces inventory costs. Additionally, because of being able to take advantage of highly sophisticated integrated circuit manufacturing techniques, modules, such as the receiver 24, can be expected to exhibit enhanced reliability and uniformity due to extensive reduction in discrete, manufactured connections.

Figure 4:
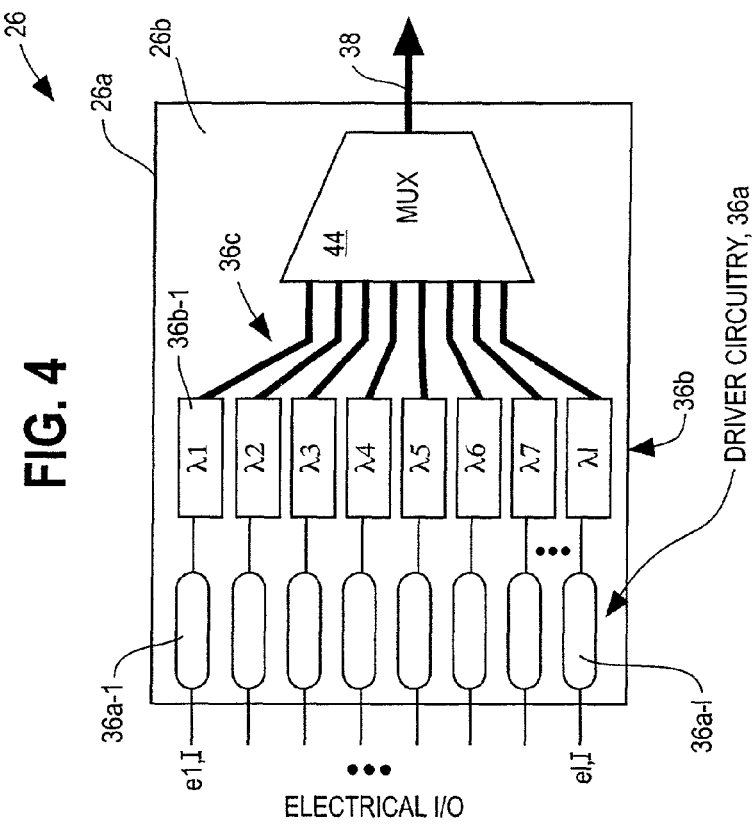
FIG. 4 illustrates details of integrated transmitter module usable in the add/drop multiplexer of FIG. 2A.

FIG. 4 illustrates details of the integrated/transmitter module 26. Transmitter module 26 incorporates a plurality of drive circuits 36a, one for each wavelength of interest, integrated on substrate 26b and a plurality of mono-chromatic sources, such as laser diodes or lasers, 36b. Each of the members of the plurality 36a, corresponding for example to 36a-1, is in turn coupled to a respective member of the plurality 36b such as the member 36b-1. In response to electrical input signals on the respective input such as input e1, I, the members of the plurality of lasers 36b emit modulated optical signals of appropriate wavelength, $\lambda 1, \lambda 2 \ldots \lambda 1$, which in turn are coupled by a plurality of waveguides 36c, integrated on/in substrate 26b, to integrated optical multiplexer 44. The composite optical signal output from multiplexer 44 is in turn coupled to optical fiber 38.

It will be understood that the members of the plurality of drive circuits 36a can be implemented with various configurations without departing from the spirit and scope of the present invention. Similarly, the sources 36b also can be implemented in various ways without departing from the spirit and scope of the present invention.

Where one or more receiver modules 24 is electrically coupled to one or more switching fabrics, such as switch 36, which is in turn coupled to one or more output modules 26, optical signals on fiber 30 can be passed through to fiber 38, or dropped via network 36. Signals can be added via network 36 to the composite optical signal on fiber 38. A variety of rates and data formats are simultaneously supportable by the configuration of FIG. 2A in view of the 2R regeneration. Additionally, the configuration of FIG. 2A is remotely configurable.

The configuration of FIG. 2A permits wavelength conversion. This results in flexibility in wavelength assignment, and elimination of wavelength blocking or stranded bandwidth. Additionally, signals exhibit uniform power levels given per channel electrical regeneration. Nodes can be added or deleted readily using the structure of FIG. 2A. Finally, the 2R regeneration provides for and supports protocol transparency. If desired, 3R regeneration, with reclocking could also be used without departing from the spirit and scope of the invention.

Figure 5:
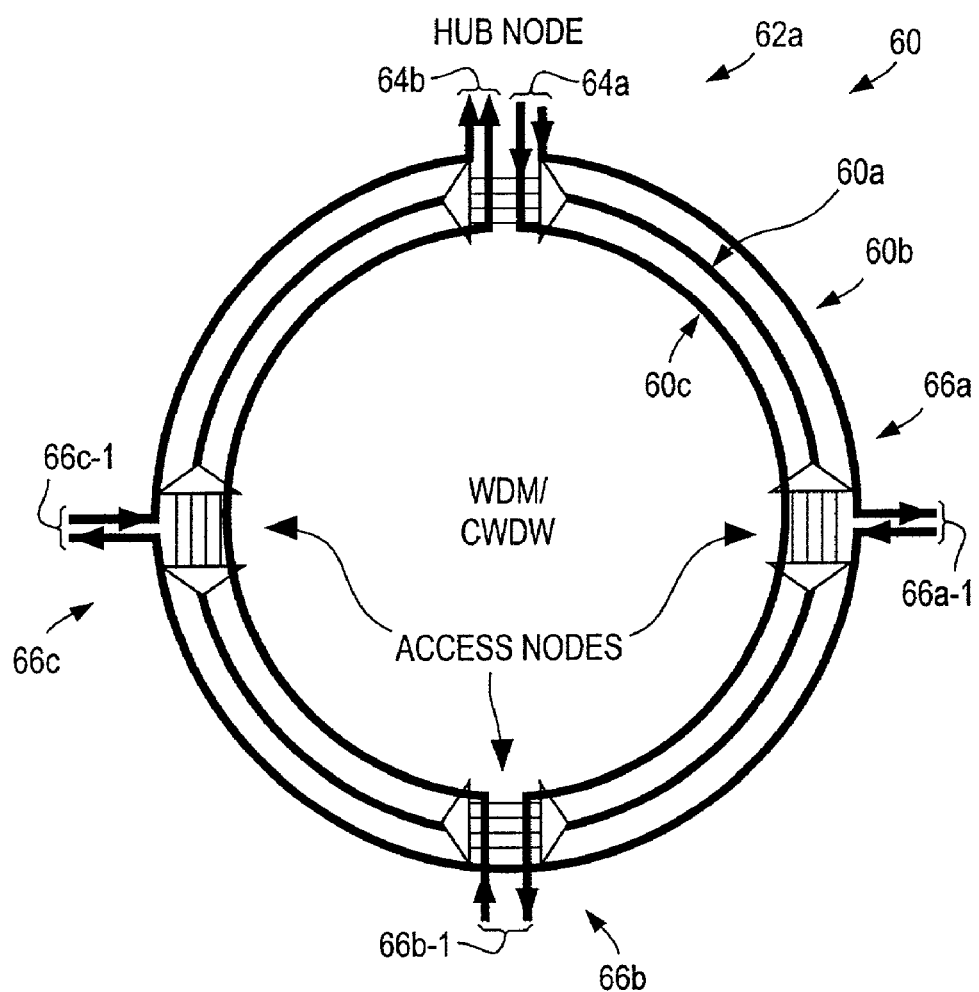
FIG. 5 illustrates a portion of an exemplary ring network which incorporates transceivers of a type illustrated in FIG. 2B.

FIG. 5 illustrates diagrammatically a portion of an exemplary ring-type network 60 which can incorporate one or more optical fibers 60a, in the ring for redundancy and backup. Hub node 62a, which can be implemented with a pair of transceivers 14a, 14b as illustrated in FIG. 2B combined with an electronic switch, such as a crosspoint switch 28 can be used for the purpose of initiating and terminating optical signals on ring 60. In such event, electrical input/output port pairs 64a, b can be used for purposes of adding and dropping signals on ring 60.

A plurality of access nodes 66a, 66b and 66c, implemented using transceivers 14a, b can be coupled to the fiber 60a. In such event, for example add/drop multiplexers 66a, c coupled to fiber 60a could be used to add and drop selected wavelengths indicated as 60b transmitted by fiber 60a via respective add/drop ports 66a-1, and 66c-1. Similarly, access node 66b can be used to add/drop other wavelengths illustrated as 60c via add/drop port 66b-1. Other variations are possible.

Figure 6:
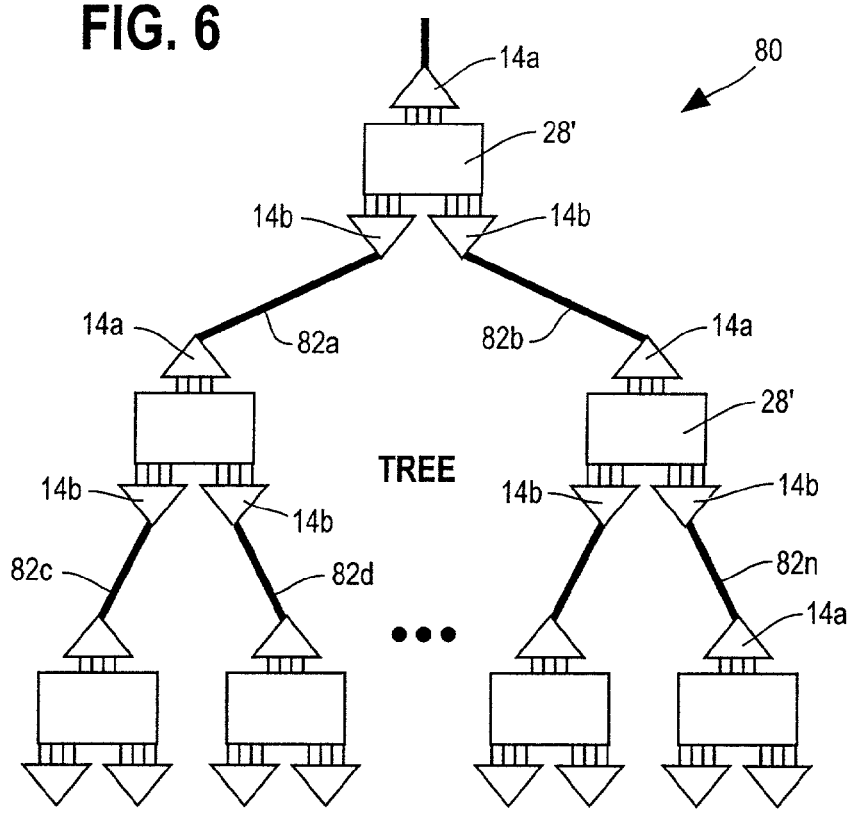
FIG. 6 illustrates a portion of an exemplary tree network formed of a plurality of nodes incorporating transceivers of a type illustrated in FIG. 2B.

FIG. 6 illustrates a portion of an exemplary tree network 80 implementable with network nodes which incorporate a crosspoint switch such switch 28' in combination with multiple identical transceiver modules 14a and 14b. The modules 14a, 14b can be linked via optical fibers such as the fibers 82a, 82b, 82c, 82d . . . 82n. It will be understood that a variety of tree configurations could be implemented using transceiver modules 14a, b, and associated switching element, such as switching element 28', without departing from the spirit and scope of the present invention. Using the switching elements 28', wavelengths can be routed to various nodes of network 80.

Figure 7:
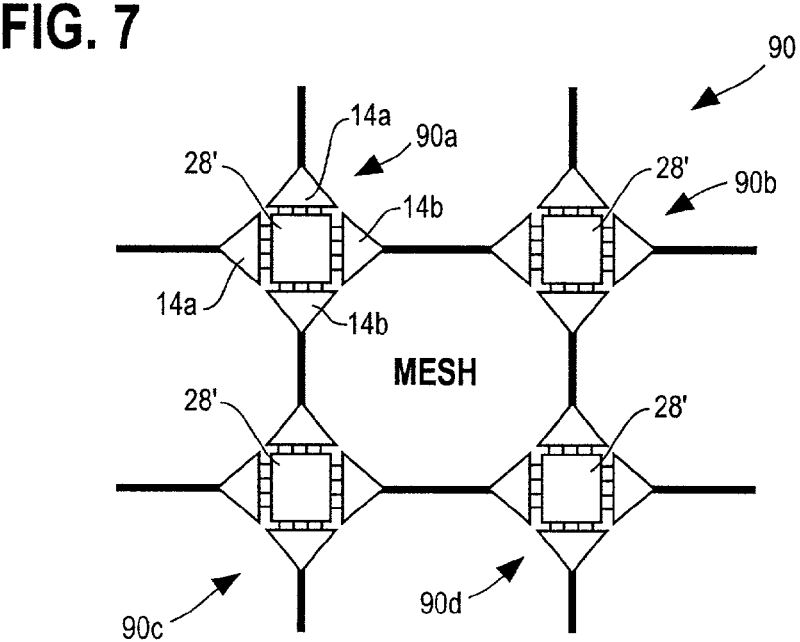
FIG. 7 illustrates a portion of an exemplary mesh network which incorporates transceivers of a type illustrated in FIG. 2B.

FIG. 7 illustrates a portion of an alternate multiple transceiver array network configuration 90 wherein a quad transceiver configuration is used to implement each of the network nodes such as nodes 90a, b, c, and d. Each of the nodes, such as the node 90a, can be implemented with four transceiver modules, such as the transceiver module 14a combined with a respective switch element, such as the switch element 28'. Using the switching elements 28', wavelengths can be routed to various nodes of network 90.

Those of skill will understand that in many wavelength division multiplex systems optical channel spacing has been standardized at 50 GHz, 100 GHz, and 200 GHz. Additionally, course wave division multiplexing (CWDM) is known wherein the channels are spaced on the order of 20 nanometers apart. It will be understood that all such spacings are compatible with and come within the scope of the present invention.

Figure 8B:
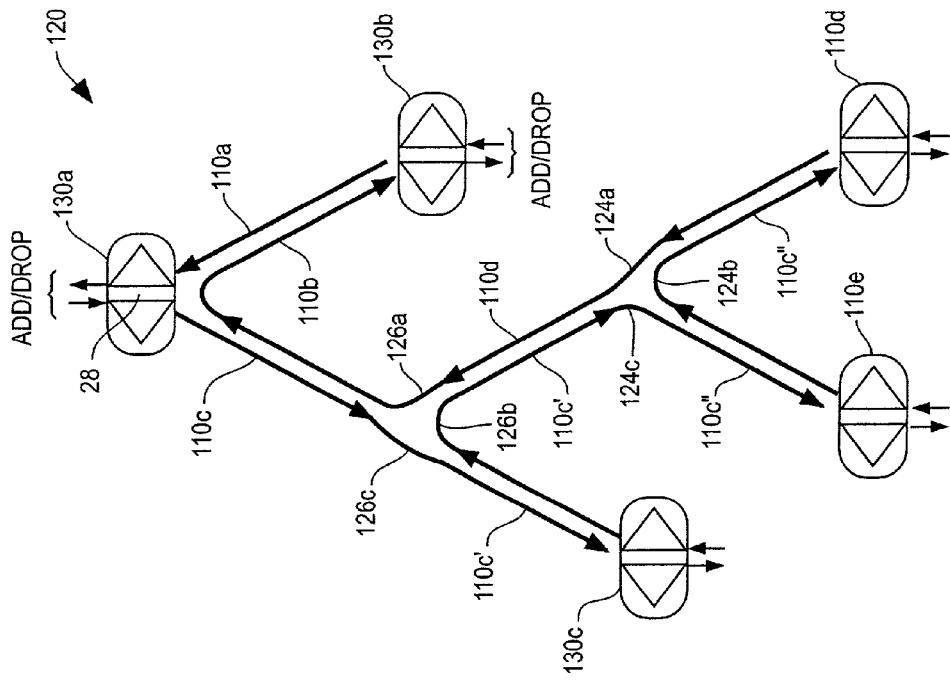
FIG. 8B illustrates a higher capacity, active, form of the network of FIG. 8A.
Figure 8A:
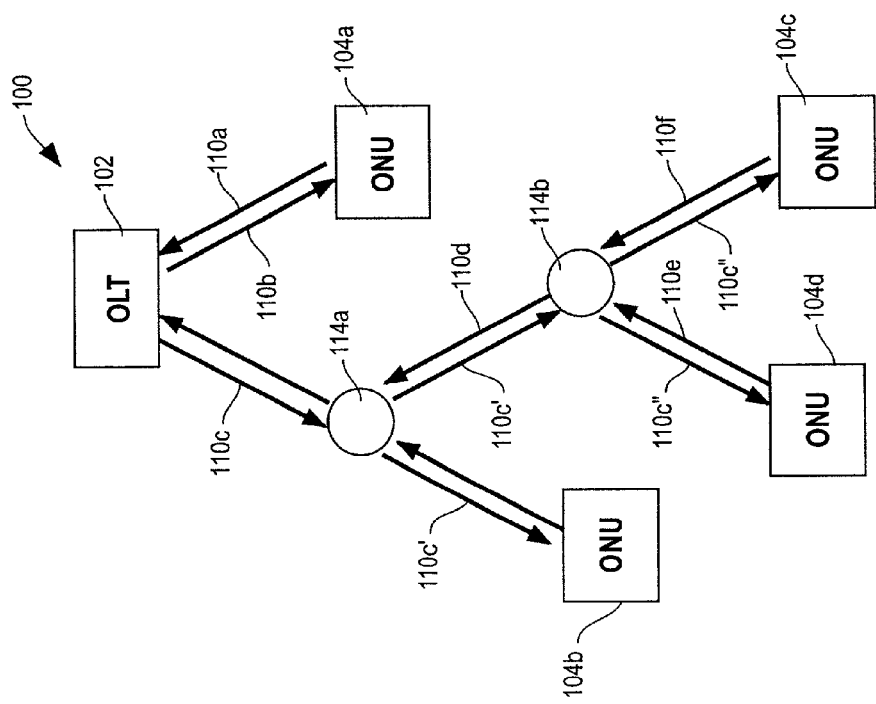
FIG. 8A illustrates a portion of a known passive optical network.

FIG. 8A illustrates a portion of a known form of passive optical network 100. Such networks as known to those of skill in the art are configured as tree networks with an optical line terminal 102 forming a base thereof. Optical networking units 104a, b, c, d form leaves, terminations, for the network 100.

The base and the leaves are interconnected by pairs of optical fibers, for example, optical fibers 110a and 110b. As known to those of skill in the art, in such networks, a single wavelength is transmitted unidirectionally in each optical fiber. The signals on a given optical fiber, such as fiber 110c, are split at passive optical splitters, such as splitters 114a, b into signals 110c'.

The passive nature of networks 100 limits both the information carrying capacity thereof as well as the geographical extent of such networks. However, the optical fibers supporting such networks have been installed and are an available resource.

FIG. 8B illustrates a portion of an up-graded, higher capacity version 120 of the network 100. The network 120, as discussed below, has the advantage that it can utilize existing installed fiber links such as the links 110a, b, c, c' and c".

In the network 120, the optical splitters 114a, b have been replaced by links of optical fiber 124a, b, c and 126a, b, c. These links join fibers, such as fibers 110d, f and 100e, c" which transmit signals in opposite directions relative to respective removed splitter 114b. This converts the network configuration 100 from a tree structure to a collapsed ring.

The passive optical network terminals and networking units 102, 104a, b, c, d are also replaced with optical add/drop multiplexer units, 130a, . . . e which could be implemented in the form of integrated receivers and transmitters 24, 26 combined with switch fabric 28, discussed previously. Alternately, the add/drop nodes 130a, b, . . . e could be implemented using discrete components. Each of the add/drop nodes, such as 130a, incorporates a reconfigurable switch fabric such as the point-to-point switch fabric 28 which provides add/drop functionality for signals being added to or dropped from the network.

The network 120, in addition to utilizing the existing installed fiber optic links can be operated as a multiple wavelength higher capacity network than is the case for the network 100. Additionally, the network 120 is reconfigurable by means of the reconfigurable switch fabrics 28. Finally, the use of active amplifier elements in the add/drop modules 130a, b . . . e makes it also possible to extend the geographical extent of the network 120 beyond that which is possible with passive network 100.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. An apparatus for a wave division multiplexing-type optical communication system comprising:

at least one of a modular integrated receiver and a modular integrated transmitter wherein the integrated receiver has an optical input port, and a plurality of electrical output ports carried by a first substrate;

an optical element carried in the receiver module by the substrate with a multiple wavelength optical input coupled to the input port and a plurality of wavelength separated optical outputs, a plurality of optical-to-electrical converters carried in the receiver module by the substrate with each converter coupled to a respective optical output;

a plurality of limiting amplifiers with each amplifier coupled to a respective converter and a respective electrical output with an output from each amplifier coupled to a member of the plurality of electrical output ports, and wherein the transmitter has a plurality of electrical input ports and an optical output port carried by a second substrate;

a plurality of electrical-to-optical converters carried by the second substrate with each member of the plurality coupled to one of the electrical input ports;

a many-to-one optical element with a plurality of inputs carried by the second substrate wherein each member of the plurality is coupled to a respective one of the electrical-to-optical converters with a multiple wavelength optical output coupled to the optical output port; and which includes the other of the transmitter module and the receiver module wherein the electrical outputs and inputs of the receiver module and the transmitter module are coupled to an electrical switching fabric.

2. An apparatus as in claim 1 wherein the receiver's optical element comprises an optical wavelength demultiplexer and the optical outputs are coupled to respective waveguides integrally formed on the first substrate.

3. An apparatus as in claim 1 wherein the receiver's element, the converters, and the limiting amplifiers are integrally formed on the first substrate.

4. An apparatus as in claim 3 wherein the receiver module exhibits K electrical output ports wherein K corresponds to the number of optical outputs from the receiver's optical element with the K optical outputs coupled to the respective optical-to-electrical converter via a respective waveguide carried by the first substrate.

5. An apparatus as in claim 1 wherein each of the limiting amplifiers includes a current-to-voltage input amplifier.

6. An apparatus as in claim 1 wherein the transmitter module includes an optical wavelength multiplexer formed on the second substrate with an output coupled to the optical output port.

7. An apparatus as in claim 6 wherein the transmitter module includes a plurality of optical sources, integrally formed on the second substrate, coupled to the electrical input ports and to the multiplexer.

8. An apparatus as in claim 7 wherein each of the sources includes drive circuitry coupled to a respective laser with the drive circuitry, the lasers and the multiplexer integrally formed on the second substrate.

9. An apparatus as in claim 8 wherein the first and second substrates comprise a single common substrate.

10. An apparatus as in claim 1 wherein the receiver module and the transmitter module are carried in a common housing.

11. An apparatus as in claim 1 wherein the transmitter electrical-to-optical converters comprise integrated drive circuits carried by the second substrate with each such circuit coupled to a respective member of a plurality of integrated optical sources.

12. An apparatus as in claim 11 with the optical sources each including a laser integrated on the second substrate.

13. An apparatus as in claim 1 with the limiting amplifiers each including a transimpedance amplifier and configured for 2R signal regeneration.

14. An apparatus as in claim 1 wherein the receiver module and the transmitter module are carried on the same substrate.

15. An apparatus as in claim 1 wherein regeneration circuits carry out one of a 2R-type regeneration function or a 3R-type regeneration function.

16. An apparatus for a wave division multiplexing-type optical communication system comprising:

at least one of a modular integrated receiver and a modular integrated transmitter wherein the integrated receiver has an optical input port, and a plurality of electrical output ports carried by a first substrate;

an optical element carried in the receiver module by the substrate with a multiple wavelength optical input coupled to the input port and a plurality of wavelength separated optical outputs, a plurality of optical-to-electrical converters carried in the receiver module by the substrate with each converter coupled to a respective optical output; and a plurality of limiting amplifiers with each amplifier coupled to a respective converter and a respective electrical output with an output from each amplifier coupled to a member of the plurality of electrical output ports, and wherein the transmitter has a plurality of electrical input ports and an optical output port carried by a second substrate;

a plurality of electrical-to-optical converters carried by the second substrate with each member of the plurality coupled to one of the electrical input ports;

a many-to-one optical element with a plurality of inputs carried by the second substrate wherein each member of the plurality is coupled to a respective one of the electrical-to-optical converters with a multiple wavelength optical output coupled to the optical output port; and with the limiting amplifiers each including a transimpedance amplifier and configured for 2R signal regeneration, with an electrical switching network coupled between the receiver outputs and the transmitter inputs.

17. An apparatus as in claim 16 wherein the electrical switching network comprises an electrical switch fabric.

18. An apparatus as in claim 16 with the receiver and the transmitter carried in a common housing.

19. An apparatus as in claim 16 wherein the amplifiers function on a per channel basis to amplify incoming signals from a respective converter.

* * * * *